United States Patent [19]
Remboski et al.

[11] Patent Number: 5,804,711
[45] Date of Patent: Sep. 8, 1998

[54] PATTERN RECOGNITION METHOD AND SYSTEM FOR DETERMINING A MISFIRE CONDITION IN A RECIPROCATING ENGINE

[76] Inventors: Donald J. Remboski, 7447 Oakman Blvd., Dearborn, Mich. 48126; Steven L. Plee, 2226 Pine Hollow, Brighton, Mich. 48116; Marvin L. Lynch, 19555 Roslyn Rd., Detroit, Mich. 48221; Michael A. McClish, 647 Thayer Blvd., Northville, Mich. 48167

[21] Appl. No.: 689,038

[22] Filed: Aug. 6, 1996

Related U.S. Application Data

[63] Continuation of Ser. No. 116,650, Sep. 7, 1993, abandoned.

[51] Int. Cl.$^6$ .................................................. G01M 15/00
[52] U.S. Cl. .......................................................... 73/117.2
[58] Field of Search ................................... 73/116, 117.3; 364/431.07, 431.08; 123/419, 436

[56] References Cited

U.S. PATENT DOCUMENTS

| | | |
|---|---|---|
| 3,908,366 | 9/1975 | Masaki . |
| 3,924,457 | 12/1975 | Oshima et al. . |
| 4,083,234 | 4/1978 | Aono et al. . |
| 4,357,662 | 11/1982 | Schira et al. . |
| 4,372,269 | 2/1983 | Coles . |
| 4,380,800 | 4/1983 | Wilkinson . |
| 4,438,647 | 3/1984 | Ozaki et al. . |
| 4,697,561 | 10/1987 | Citron . |

(List continued on next page.)

FOREIGN PATENT DOCUMENTS

| | | |
|---|---|---|
| 4002208 A1 | 8/1991 | Germany . |
| 4028131 A1 | 3/1992 | Germany . |
| 4131383 A1 | 3/1992 | Germany . |
| WO90/02871 | 3/1990 | WIPO . |
| WO91/11599 | 8/1991 | WIPO . |

OTHER PUBLICATIONS

Methods of On–Board Misfire Detection; Gunther Plapp, Martin Klenk, Winfried Moser, Robert Bosch GMbH, 900232.

Diagnosis of Individual Cylinder Misfires by Signature Analysis of a Pcrankshaft Speed Fluctuations; G. Rizzoni, University of Michigan Vehicular Electronics Lab, Copyright 1989 Society of Automotive Engineers, Inc. 890884.

Sae the Engineering Resource for Advancing Mobility, International Congress and Exposition Detroit, Michigan Feb. 24–28, 1986, 860028.

Digital Filters; Analysis and Design, Copyright 1979 by McGraw–Hill, Inc. Library of Congress Cataloging in Publication Data.

Digital Signal Processing in VSI; 1990 by Analog Devices, Inc., Norwood, MA Published by Prentice–Hall, Inc. pp. 173–197.

*Primary Examiner*—Robert Raevis

[57] ABSTRACT

A method, and a corresponding system, for determining misfire in a reciprocating engine measures engine crankshaft angular velocity and provides an angular velocity signal as measured from the engine crankshaft (403). A filtered acceleration signal, dependent on the engine crankshaft angular velocity signal and independent of normal combustion information and other high-order effects is provided via filtering (405). When the filtered acceleration signal exceeds a threshold dependent on at least one of the following; engine speed, engine load, or engine temperature (711), a misfire is indicated. Preferably, prior to the misfire determination, the filtered acceleration signal (701) is sampled over a first period of engine crankshaft rotation to provide a first data point (703), over a second period of engine crankshaft rotation to provide a second data point (707), and over a third period of engine crankshaft rotation to provide a third data point (705). Then, an average of the first and third data points is subtracted from the second data point and a combined acceleration signal is provided (511). Then, a misfire is indicated (517) when the combined acceleration signal exceeds the threshold (513). Preferably, this sampling of the filtered acceleration signal is continuous, and the sampling of the first, second and third data points is separated by two engine crankshaft rotations.

38 Claims, 3 Drawing Sheets

U.S. PATENT DOCUMENTS

| | | |
|---|---|---|
| 4,766,863 | 8/1988 | Fujimori . |
| 4,932,379 | 6/1990 | Tang et al. . |
| 4,936,277 | 6/1990 | Deutsch et al. . |
| 5,044,194 | 9/1991 | James et al. . |
| 5,044,195 | 9/1991 | James et al. . |
| 5,076,098 | 12/1991 | Miwa . |
| 5,088,318 | 2/1992 | Osawa . |
| 5,095,742 | 3/1992 | James et al. . |
| 5,105,181 | 4/1992 | Ross . |
| 5,109,695 | 5/1992 | James et al. . |
| 5,186,136 | 2/1993 | Kadomukai et al. ............... 123/192.11 |
| 5,200,899 | 4/1993 | Ribbens et al. .................... 364/431.08 |
| 5,239,473 | 8/1993 | Ribbens et al. .................... 364/431.08 |
| 5,241,480 | 8/1993 | Takaku et al. ........................ 123/419 |
| 5,331,848 | 7/1994 | Nakagawa et al. ...................... 73/116 |

PATTERN RECOGNITION METHOD AND SYSTEM FOR DETERMINING A MISFIRE CONDITION IN A RECIPROCATING ENGINE

This is a continuation of application Ser. No. 08/116,650, filed Sep. 7, 1993 and now abandoned.

FIELD OF THE INVENTION

This invention is related to the field of misfire detection within a reciprocating engine, and more specifically to a method, and corresponding apparatus, for determining misfire in a reciprocating engine by interpreting acceleration of the engine's crankshaft.

BACKGROUND OF THE INVENTION

Misfire detection systems are employed in contemporary electronic engine controls for detecting a misfire of combusting cylinders in a reciprocating engine. Misfiring causes a loss of power, dumps unburned fuel into a catalytic converter—thereby shortening its life, and causes higher levels of hazardous emissions. The need to identify whether a misfire has occurred is a strict requirement, based on more stringent government regulation.

Some prior art misfire detection schemes include the detection of engine torque based on measuring engine crankshaft velocity. This velocity based scheme predicts a misfiring condition if a meaningful change in the average velocity occurs. This scheme is inaccurate and unreliable because of many sources of error in the torque behavior—thereby velocity behavior of the engine's crankshaft. Largely, the various torque behaviors are periodic in nature.

Several sources of undesirable torque behavior may be present in an area of the spectrum that misfire may occur in, and are thus unfilterable without a loss of misfire related torque information. In particular, those torque behaviors that occur at periods equal to or less than a period related to a potential misfiring rate of the engine are of particular interest.

A potential misfiring rate of an engine can be represented as follows. In a four-cycle engine, a complete firing of all cylinders is executed over two revolutions or 720° of crankshaft rotation. Because of this relationship between periodicity of cylinder firings and crankshaft rotation, two different misfiring signals commonly emerge. A first signal is caused by one cylinder continuously misfiring. Since the misfiring cylinder is active every 720° of crankshaft rotation, a torque behavior associated with this case occurs once every two cycles of crankshaft rotation—thus at one-half cycle per crankshaft revolution. This is commonly referred to as a half-order behavior—or effect. A second common behavior is that of two cylinders misfiring. This is typically caused by a failure in the ignition circuit which often pairs cylinders with common circuitry to be cost effective. If two cylinders are misfiring, the misfire rate is two per 720° or one cycle per crankshaft revolution. This is commonly referred to as a first-order behavior—or effect.

Undesirable torque behavior potentially occurring within this spectrum of one-half to one cycle per crankshaft revolution includes a first-order effect of crankshaft twist, induced by reciprocating inertia torque. Crankshaft twist is a caused by a torque due to a reciprocating mass of the engine as the engine crankshaft turns. Under significant amounts of stimulation caused by the reciprocating masses, the crankshaft is relatively flexible. Mostly, the crankshaft twist is due to a torque imbalance between the front and the back of an engine and the relative flexibility of the crankshaft. The absolute frequency that the resulting twist occurs at, is dependent on engine crankshaft angular velocity. At high crankshaft angular velocities the torque causing this crankshaft twist is substantially greater than the combustion torque. This becomes a major source of torque error at these high crankshaft angular velocities.

First-order effects include piston mass imbalance. Piston mass imbalance is caused by individual cylinders having different masses. Piston mass imbalance can be understood best by a brief example. If all cylinders except one cylinder have the same amount of mass, then a torque component will be present on every crankshaft rotation, when the piston having the different mass effects the crankshaft moment of inertia—thus torque. Since this happens every rotation of the crankshaft, the behavior will have a periodicity of one-cycle/rev and thus has a first-order behavior.

Half-order effects include combustion imbalance between cylinders. Combustion imbalance manifests itself when differences in torque contribution due to combustion from the individual cylinders exists. The result is a behavior much the same as the piston imbalance effect.

Therefore, schemes that attempt to detect a misfire condition based on measuring a parameter dependent on engine crankshaft torque, without taking into consideration the aforementioned torque behaviors coexisting with significant influence in the same spectrum as the misfiring behavior, will not work accurately or reliably over all engine operation conditions.

What is needed is an improved method and corresponding system for detecting misfire in reciprocating engines that is more reliable and accurate and is adaptable to account for the various half-order and first-order spectral effects such as crankshaft twist, piston mass imbalance, and combustion imbalance.

DETAILED DESCRIPTION OF A PREFERRED EMBODIMENT

A method, and a corresponding system, for determining misfire in a reciprocating engine measures engine crankshaft velocity and provides an angular velocity signal as measured from the engine crankshaft. The angular velocity signal is filtered in response to engine crankshaft angular velocity to remove all information related to normal combustion and other high-order effects. Preferably, this is filtering accomplished by a lowpass filter. A filtered acceleration signal is provided in response to the filtered velocity signal. When at least two data points, extracted from the filtered acceleration signal in combination exceed a threshold dependent on at least one of the following; engine speed, engine load, or engine temperature, a misfire is indicated. Preferably, prior to the misfire determination, the filtered acceleration signal is sampled over a first period of engine crankshaft rotation to provide a first data point, over a second period of engine crankshaft rotation to provide a second data point, and over a third period of engine crankshaft rotation to provide a third data point. Then, an average of the first and third data points is subtracted from the second data point and a combined acceleration signal is provided. Then, a misfire is indicated when the combined acceleration signal exceeds the threshold. Preferably, this sampling of the filtered acceleration signal is continuous, and the sampling of the first, second and third data points is separated by two engine crankshaft rotations. An understanding of the details of the present embodiment will be aided by a description of the attached figures.

Figure 1:
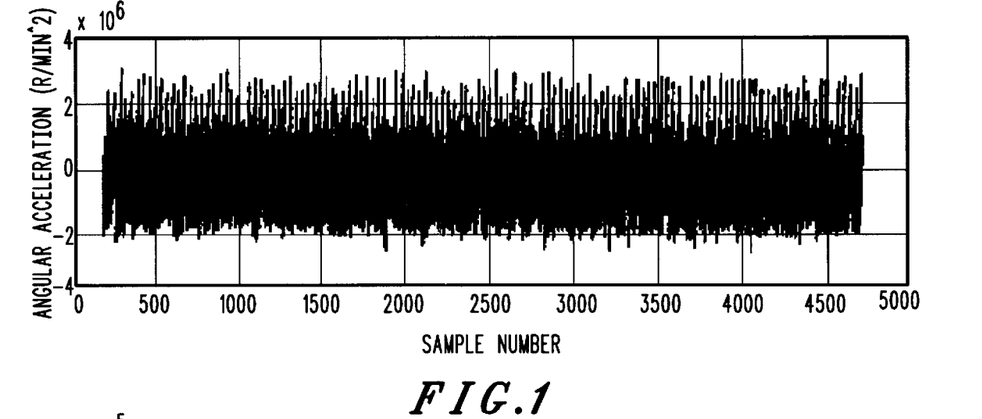
FIG. 1 is a diagram showing an engine crankshaft acceleration signal extracted from a running engine by measuring rotation of an engine's crankshaft.

FIG. 1 shows an engine crankshaft acceleration signal extracted from a running engine by measuring rotation of an engine's crankshaft. The data in this engine crankshaft acceleration signal includes continuous misfires. This signal is preferably derived from a measurement of engine crankshaft velocity. Without further processing the misfire information is lost in this signal because of the substantial influence associated with the firing torque and other high order torque behaviors.

Figure 2:
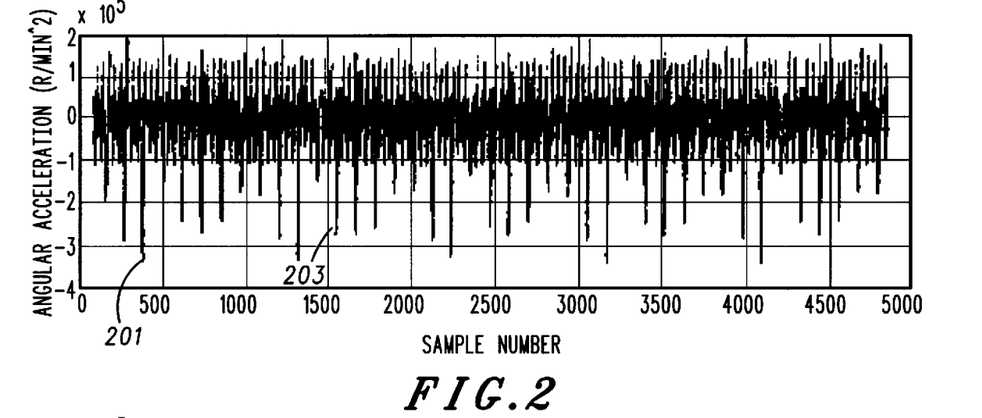
FIG. 2 is a diagram illustrating a filtered engine crankshaft acceleration signal.

FIG. 2 illustrates a filtered engine crankshaft acceleration signal derived from an engine crankshaft velocity signal. Essentially, in this filtered signal, all acceleration information related to normal combustion has been filtered out. Additionally, any other high order acceleration effects such as torsional vibrations occurring at the natural frequency of the crankshaft system, and torque due to reciprocating mass, are filtered in this signal. Reference numbers 201 and 203 indicate decelerations caused by various misfire behavior. Note that the signal-to-noise ratio is not predictable. This is primarily due to the undesirable torque behavior corresponding to the half-order and first-order effects, unrelated to misfire, described in the background section. To reliably determine a misfiring condition from the signal shown in FIG. 2, the signal-to-noise ratio must preferably be improved, particularly in the case of a soft, or intermittent, misfiring condition.

The signal-to-noise ratio can be improved by canceling out the half-order and first-order effects unrelated to misfire. Typically, hard, or continuous, misfire does manifest itself in either a half-order or first-order behavior depending on the cause of the misfire behavior. As described in the background section, a first misfire acceleration is caused by one cylinder continuously misfiring. Since the misfiring cylinder is active every 720° of crankshaft rotation, a torque behavior associated with this case occurs once every two cycles of crankshaft rotation—thus at one-half cycle per crankshaft revolution. This is commonly referred to as a half-order behavior—or effect. A second common behavior is that of two cylinder's misfiring. This is typically caused by a failure in the ignition circuit which often pairs cylinders with common circuitry to be cost effective. If two cylinders are misfiring, the misfire rate is two per 720° or one cycle per crankshaft revolution. This is commonly referred to as a first-order behavior—or effect.

A signal-to-noise ratio improvement technique may cancel the observation of these hard misfires. This is because the noise, or undesirable acceleration based on for instance crankshaft twist, shares the same half-order or first-order behavior as the hard misfire. Therefore, provision must be made for this eventuality. Next, a system block diagram will be introduced.

Figure 3:
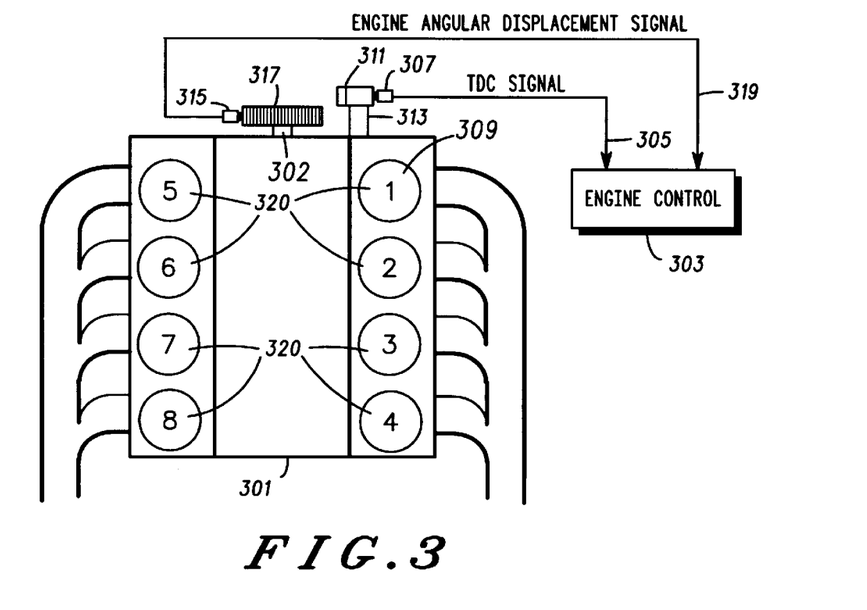
FIG. 3 is a system block diagram in accordance with the invention.

FIG. 3 shows an 8 cylinder engine 301 with a crankshaft 302. A related engine control 303 has an input, for receiving a TDC signal 305 from a camshaft rotational sensor 307, which indicates a top-dead-center, or TDC, of cylinder #1 309 of the 8 cylinders 320 of the engine 301. This TDC signal 305 is provided responsive to measuring a lobe 311 on the end of a camshaft 313. This camshaft rotational sensor 307 provides the TDC signal 305 to the engine control 303 every 720° of crankshaft 302 angular rotation. The TDC signal 305 is used by the engine control system 303 to determine a starting point for measuring which of the cylinders 320 is currently firing—thus causing acceleration of the engine's crankshaft.

Another input to the engine control is provided by an engine angular displacement sensor 315 which measures engine angular displacement, by sensing a toothed wheel 317, mounted on the engine's crankshaft 302. This engine angular displacement sensor 315 provides an engine angular displacement signal 319, to the engine control system 303, every 10° of engine crankshaft 302 rotation based on a tooth-space pattern on the toothed wheel 317. The engine angular displacement signal 319 is used by the engine control 303 to measure engine angular velocity, crankshaft acceleration, and also to identify the active cylinder in case of a misfire.

The engine control 303 includes a microcontroller. In this case the microcontroller is a Motorola MC68HC16Z1. Those skilled in the art will recognize other equivalent microcontroller platforms capable of executing the preferred method described below. Conveniently, the microcontroller 303 converts the signals 305 and 319 from pulses to digital information representative of the information contained in the pulses used later in the executed method steps. Next the method steps will be detailed.

Figure 4:
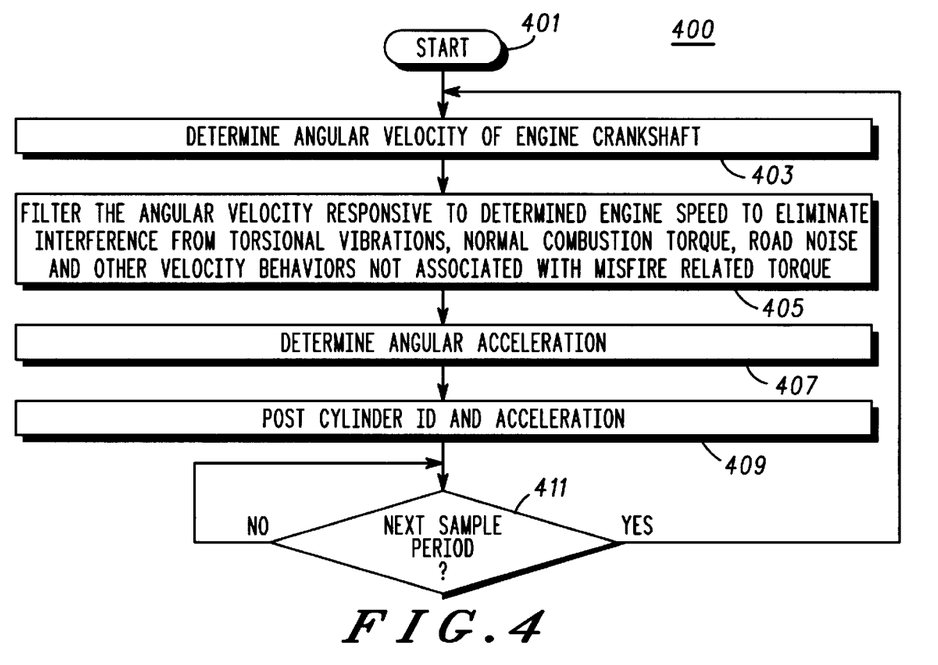
FIG. 4 is a flow chart illustrating various method steps for acquiring engine crankshaft acceleration, in accordance with the invention.

FIG. 4 illustrates part of a preferred method for misfire detection in flow chart form. Primarily it acquires engine crankshaft acceleration information for later analysis. It includes provision for filtering out undesirable torque information including normal combustion related torque. Also it includes provision for improving the signal-to-noise ratio of the engine crankshaft acceleration information, and provision for detecting both hard and soft misfires. This method may conveniently be encoded into firmware for execution on the engine control's 303 Motorola MC68HC16Z1 microcontroller.

The improved method steps are continuously executed and start with step 401.

Next, in step 403 an angular velocity of the engine's crankshaft is determined. This is accomplished by monitoring the engine angular displacement signal 319. The engine control's 303 Motorola MC68HC16Z1 microcontroller determines angular velocity of the engine's crankshaft by measuring the time between successive teeth of the tooth-space pattern on the toothed wheel 317. The result of step 403 is to provide a discrete value representative of the engine's engine crankshaft angular velocity. As this step 403 is continuously repeated, this discrete value forms an angular velocity signal.

Then, in step 405 the method filters the angular velocity signal to remove unwanted torque information in the angular velocity information. This filtering step is accomplished primarily with a digital lowpass filter algorithm executing on the engine control's 303 Motorola MC68HC16Z1 microcontroller. Preferably a 32 tap FIR, Finite Impulse Response, type digital filter is applied. This filter is tuned responsive to engine crankshaft angular velocity. The filter cutoff is set to one-cycle per revolution of the engine's crankshaft. Thus this filter is considered to have a first-order response and is therefore tuned proximate one cycle per crankshaft revolution. As the engine crankshaft angular velocity changes the filter cutoff frequency responds to another cutoff point corresponding to one-cycle per crankshaft revolution at the new crankshaft speed. Crankshaft speed is determined by interpreting the engine angular displacement signal 319.

Primarily, as mentioned above, the filter has a lowpass response to remove normal combustion torque, and other high order acceleration effects such as torsional vibrations occurring at the natural frequency of the crankshaft system, and torque due to reciprocating mass, and other velocity behaviors not associated with torque below the first-order. Of course, other filter responses can also be used to eliminate various sources of torque error.

Crankshaft torsional effects are largely predictable and related to a resonance of the engine's crankshaft. Fortunately, these resonance's occur at a fixed frequency while the engine operates at different speeds. Advantageously, this resonance is of an order high enough to be filtered out by the first-order filter, even at high engine crankshaft angular velocities.

Next, in step 407 a crankshaft angular acceleration is determined as a function of the filtered engine angular velocity signal provided by step 405, and a filtered acceleration signal is provided. This corresponds to the signal shown in FIG. 2.

Then, in step 409 the filtered acceleration signal, and a cylinder ID (identification) are posted in a memory buffer indigenous to the engine control 303. The cylinder ID identifies the active cylinder causing acceleration on the engine's crankshaft.

Next, in step 411 the routine 400 waits until a current sample period expires. The sample period is based on engine angular displacement. In the present embodiment 18 sample periods per engine crankshaft revolution, thus 36 samples per 720° engine cycle, are used. Then the routine 400 repeats starting at step 403.

Figure 5:
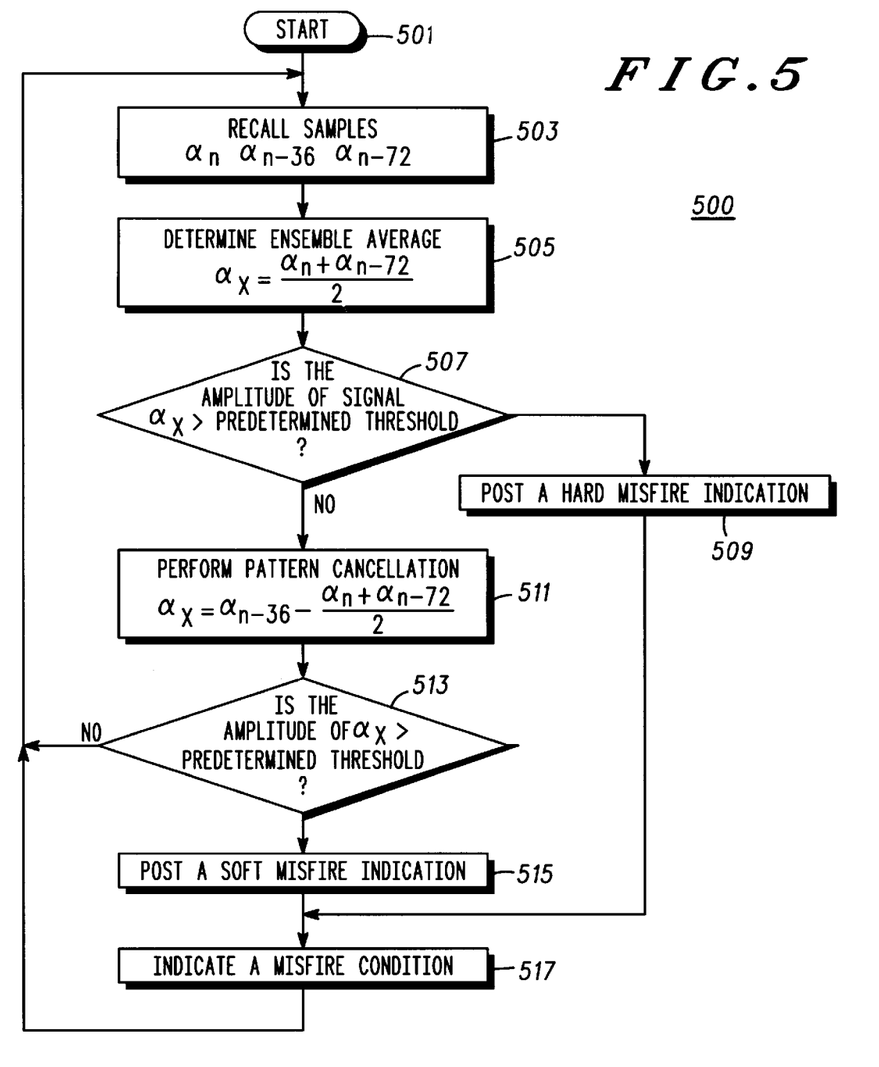
FIG. 5 is a diagram showing flow chart illustrating various method steps for detecting hard misfire and improving a signal-to-noise ratio for detecting soft misfire, in accordance with the invention.

FIG. 5 is a flow chart showing method steps associated with improving the aforementioned signal-to-noise ratio and detecting both soft and hard misfiring conditions. These method steps 500 are executed concurrently with the method-steps 400 shown in FIG. 4. The routine 500 is entered at step 501.

Then, in step 503 three separate samples of the filtered acceleration signal are extracted from the memory buffer. These preferably include a first data point $\alpha_n$, the present filtered acceleration signal, a second data point $\alpha_{n-36}$, the filtered acceleration signal from 36 sample periods previous to the present sample, and a third data point $\alpha_{n-72}$, the filtered acceleration signal from 72 sample periods previous to the present sample. Since there are 18 samples per engine crankshaft revolution these sample represent engine crankshaft acceleration from three separate engine cycles and thereby have information associated with half-order and first-order crankshaft acceleration behavior.

Next, in step 505 an ensemble average $\alpha_x$ is determined from the first data point $\alpha_n$, and the third data point $\alpha_{n-72}$. This is determined using the following equation.

Equation 1

$$\alpha_x = \frac{\alpha_n + \alpha_{n-72}}{2}$$

Then, in step 507 the resulting combined acceleration signal $\alpha_x$ is compared to a threshold dependent on at least one of the following; engine speed, engine load, or engine temperature. This threshold is determined empirically and may be different for different engine families. Preferably, a different threshold will be used for low engine speeds and high engine speeds. Also, certain other engine speed ranges may have different thresholds depending on engine characteristics associated with a particular engine design. The threshold can also be dependent on engine load if a particular engine design requires it. Additionally, engine temperature can also affect the determination of the threshold. In particular, the misfire determination may only be enabled when the engine operating temperature reaches a certain level. This level can be measured by a temperature sensor that measures a water jacket temperature or optionally a manifold temperature. The enablement of the misfire detection can be effected by providing a threshold set too high to detect misfire until the engine temperature is above the predetermined level. Then the threshold can be lowered to allow misfire detection. If the combined acceleration signal $\alpha_x$ exceeds the threshold, then step 509 is executed.

In step 509 a hard misfire indication is posted. If the combined acceleration signal $\alpha_x$ does not exceed the threshold, then step 511 is executed. In step 511 pattern cancellation is performed on the filtered acceleration signal to improve the signal-to-noise ratio to eliminate any half-order and first order effects unrelated to misfire by averaging—thus de-emphasizing their importance.

This is determined using the following equation.

Equation 2

$$\alpha_x = \alpha_{n-36} - \left( \frac{\alpha_n + \alpha_{n-72}}{2} \right)$$

Figure 6:
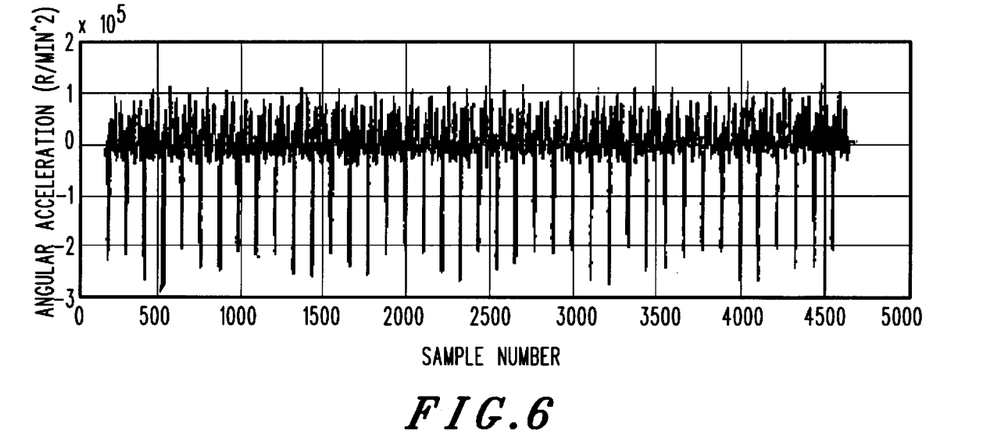
FIG. 6 is a chart showing a filtered and pattern canceled acceleration waveform in accordance with the invention.

FIG. 6 is a chart showing a continuous acceleration waveform after the pattern cancellation step 511 from routine 500. Note the consistency of the misfire related decelerations when compared to FIG. 2. This is caused by the improved signal-to-noise ratio.

Next, in step 513 the resulting combined acceleration signal $\alpha_x$ is compared to another threshold dependent on at least one of the following; engine speed, engine load, or engine temperature. This another threshold is determined empirically and may be different for different engine families. If the combined acceleration signal $\alpha_x$ exceeds the another threshold, then step 515 is executed. If the combined acceleration signal $\alpha_x$ does not exceed the another threshold, then no misfire occurred and the routine 500 is iterated starting at step 503.

In step 515 a soft misfire indication is posted. Next, in step 517 the misfire indication, along with its type is indicated. In this case it is simply logged into memory. Alternatively, the misfire may be reported to another system. Then, the routine 500 is repeated starting at step 503.

Figure 7:
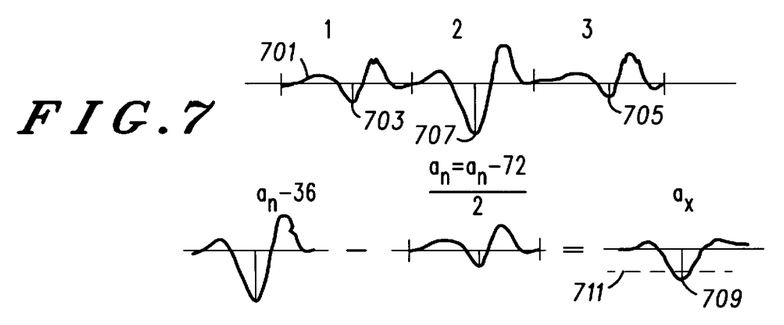
FIG. 7 is a chart showing various acceleration waveforms in accordance with the invention.

An example of the results of the steps in routines 400 and 500 is shown in FIG. 7.

FIG. 7 shows an acceleration waveform. Although this is shown as a continuous waveform to illustrate the continuous nature of the preferred technique, the engine control's 303 Motorola MC68HC16Z1 microcontroller actually acquires and operates on discrete acceleration measurements provided in the above-mentioned routine 400. Reference number 701, shows the acceleration waveform representative of a crankshaft acceleration profile extending over 6 revolutions of the engine crankshaft, or 3 engine cycles ~1, ~2, and ~3 and is generally representative of a portion of the waveform series shown in FIG. 2. Reference numbers 703, 705, and 707 show three discrete measurements of the crankshaft acceleration profile separated by one engine cycle each. These are provided from the routine 400 in step 409. Generally, the waveform 701 representing the crankshaft acceleration profile, illustrates a first-order crankshaft acceleration behavior extending over the 3 engine cycles. This acceleration behavior is characteristic of crankshaft twist. Each of the discrete measurements shown by reference numbers 703, and 705 have this undesirable half-order and first-order acceleration, thus torque, behavior. Also, during the second engine cycle an intermittent, or soft misfire has occurred and in combination with the crankshaft twist is represented by reference number 707.

After the continuous pattern recognition as taught above, principally in step 511, the resulting waveform $\alpha_x$ exceeds 709 the threshold, and thereby a misfire will be indicated. Since the active cylinder's ID was posted in step 409 the engine control's 303 Motorola MC68HC16Z1 microcontroller can also indicate which cylinder caused the determined misfire.

Although only three engine cycles are shown in the pattern cancellation example, a plurality of cycles may be used to further improve the signal-to-noise ratio. For instance, applying two engine cycles on each side of above-mentioned engine cycle ~2 has shown improved results. This is because the first-order and half-order behaviors are averaged over more cycles thereby improving the signal-to-noise ratio of the measurement before misfire determination. In this case samples of two contiguous pre-cycles and two contiguous post cycles are ensemble averaged before the pattern cancellation is achieved by subtracting the ensemble average from the median engine cycle. For example:

Equation 3

$$\alpha_x = \alpha_{n-72} - \left( \frac{\alpha_n + \alpha_{n-36} + \alpha_{n-108} + \alpha_{n-144}}{4} \right)$$

Although the above example shows application to a four-stroke engine. Those skilled in the art will easily extend this to two-stroke engines. Also, although the improved method and system teaches filtering the engine angular velocity signal, alternatively, an engine crankshaft acceleration signal derived from the unfiltered engine angular velocity signal, may be filtered to remove all of the normal combustion information.

In conclusion a method, and a corresponding system, for determining misfire in a reciprocating engine measures engine crankshaft acceleration and provides an acceleration signal. The acceleration signal is filtered to remove all acceleration information related to normal combustion. When the filtered acceleration signal exceeds a threshold a misfire is indicated. The improved method and system determines both hard and soft misfires. Additionally, this technique includes pattern cancellation for improving the signal-to-noise ratio for soft misfire determination. Also, the improved technique detects misfire more reliably and accurately than prior art schemes, and is adaptable to account for the various half-order and first-order spectral effects such as crankshaft twist, piston mass imbalance, and combustion imbalance.

What is claimed is:

1. A method for determining misfire in a reciprocating engine, said method comprising the steps of:

measuring engine crankshaft angular velocity and providing an angular velocity signal responsive thereto;

filtering to provide a filtered acceleration signal dependent on the engine crankshaft angular velocity signal and independent of normal combustion information;

extracting a data point from the filtered acceleration signal during a first revolution of the engine's crankshaft;

extracting another data point from the filtered acceleration signal during another revolution of the engine's crankshaft following the first revolution of the engine's crankshaft; and comparing the filtered acceleration signal to a threshold dependent on engine temperature, and providing a misfire indication when an amplitude of an average of the data point and the another data point exceeds the threshold.

2. A method for determining misfire in a reciprocating engine, said method comprising the steps of:

measuring engine crankshaft angular velocity and providing an angular velocity signal responsive thereto;

filtering to provide a filtered acceleration signal dependent on the engine crankshaft angular velocity signal and independent of normal combustion information;

measuring the filtered acceleration signal over a first period of engine crankshaft rotation and providing a first acceleration signal responsive thereto;

measuring the filtered acceleration signal over a second period of engine crankshaft rotation and providing a second acceleration signal responsive thereto, wherein the second period is associated with a different engine cycle than the first period;

measuring the filtered acceleration signal over a third period of engine crankshaft rotation and providing a third acceleration signal responsive thereto, wherein the third period is associated with a different engine cycle than the first and second periods;

averaging the first engine crankshaft acceleration signal and the third engine crankshaft acceleration signal and providing an average acceleration signal;

subtracting the average acceleration signal from the second engine crankshaft acceleration signal and providing a combined acceleration signal; and comparing the filtered acceleration signal to a threshold dependent on engine temperature, and providing a misfire indication when an amplitude of the combined acceleration signal exceeds the threshold.

3. A method in accordance with claim 2 wherein said step of measuring engine crankshaft acceleration over a first period of engine crankshaft rotation includes measuring engine crankshaft acceleration over a first period encompassing a plurality of engine crankshaft revolutions.

4. A method in accordance with claim 3 wherein said step of measuring engine crankshaft acceleration over a second period of engine crankshaft rotation includes measuring the engine crankshaft acceleration over a second period of engine crankshaft rotation encompassing a plurality of engine crankshaft revolutions directly following the plurality of engine crankshaft revolutions associated with the step of measuring engine crankshaft acceleration over a first period of engine crankshaft rotation.

5. A method in accordance with claim 3 wherein said step off measuring engine crankshaft acceleration over a second period of engine crankshaft rotation includes measuring engine crankshaft acceleration over a second period of engine crankshaft rotation after said step of measuring engine crankshaft acceleration over a first period of engine crankshaft rotation, and before said step of measuring engine crankshaft acceleration over a third period of engine crankshaft rotation.

6. A method in accordance with claim 2 wherein said steps of measuring engine crankshaft acceleration over each of the first, second, and third periods of engine crankshaft rotation are executed contiguously such that said measurement steps measure the engine crankshaft acceleration over at least six contiguous rotations of the engine crankshaft.

7. A method in accordance with claim 2 further comprising a step of identifying a cylinder associated with an engine angular position when an amplitude of the combined acceleration signal exceeds the threshold.

8. A method for determining misfire in a reciprocating engine, said method comprising the steps of:
measuring engine crankshaft angular velocity and providing an angular velocity signal responsive thereto;
filtering to substantially remove information related to normal combustion and providing a filtered acceleration signal dependent on the engine crankshaft angular velocity signal and independent of normal combustion information;
extracting a first data point from the filtered acceleration signal;
extracting a second data point from the filtered acceleration signal;
extracting a third data point from the filtered acceleration signal;
providing a misfire indication when an average of the first and third data points subtracted from the second data point exceeds a threshold dependent on at least one engine characteristic selected from a group of engine characteristics consisting of engine speed, engine load, and engine temperature.

9. A method in accordance with claim 8 wherein said step of extracting a first data point further comprises extracting a first series of data points over a period encompassing a plurality of engine crankshaft revolutions.

10. A method in accordance with claim 9 wherein said step of extracting a second data point further comprises extracting a second series of data points over a period encompassing a plurality of engine crankshaft revolutions directly following the plurality of engine crankshaft revolutions associated with the step of extracting a first series of data points.

11. A method in accordance with claim 10 wherein said step of extracting a third data point further comprises extracting a third series of data points over a period encompassing a plurality of engine crankshaft revolutions directly following the plurality of engine crankshaft revolutions associated with the step of extracting a second series of data points.

12. A method in accordance with claim 11 wherein said step of extracting a second series of data points includes extracting a second series of data points after said step of extracting a first series of data points, and before said step of extracting a third series of data points.

13. A method in accordance with claim 8 wherein each of said steps of extracting a first, second, and third series of data points are executed contiguously such that said extraction steps extract the engine crankshaft acceleration from the filtered acceleration signal over at least six adjacent rotations of the engine crankshaft.

14. A method for determining misfire in a reciprocating engine, said method comprising the steps of:
continuously measure engine crankshaft angular velocity and providing an angular velocity signal responsive thereto;
filtering to substantially remove information related to normal combustion and for providing a filtered acceleration signal dependent on the engine crankshaft angular velocity signal and independent of normal combustion information;
extracting a first series of data points representative of contiguous engine crankshaft accelerations from the provided a filtered acceleration signal;
extracting a second series of data points representative of contiguous engine crankshaft accelerations from the provided a filtered acceleration signal;
extracting a third series of data points representative of contiguous engine crankshaft accelerations from the provided a filtered acceleration signal;
providing a fourth series of data points, wherein each of the data points in the fourth series of data points corresponds to an average of each of the data points in the first and third series of data points; and
providing a misfire indication when an average of the fourth data points subtracted from the second series of data points exceeds a threshold dependent on at least one engine characteristic selected from a group of engine characteristics consisting of engine speed, engine load, and engine temperature.

15. A system for determining misfire in a reciprocating engine, said system comprising:
means for measuring engine crankshaft angular velocity and providing an angular velocity signal responsive thereto;
means for filtering to substantially remove information related to normal combustion and for providing a filtered acceleration signal dependent on the engine crankshaft angular velocity signal and independent of normal combustion information;
means for extracting a first data point from the filtered acceleration signal during a first revolution of the engine's crankshaft and for extracting a second data point from the filtered acceleration signal during another revolution of the engine's crankshaft following the first revolution of the engine's crankshaft; and
means for comparing the filtered acceleration signal to a threshold dependent on engine temperature, and providing a misfire indication when an amplitude of an average of the first data point and the second data point exceeds the threshold.

16. A system for determining misfire in a reciprocating engine, said system comprising:
means for measuring engine crankshaft angular velocity and providing an angular velocity signal responsive thereto:
means for filtering to substantially remove information related to normal combustion and for providing a filtered acceleration signal dependent on the engine crankshaft angular velocity signal and independent of normal combustion information;
means for measuring the filtered acceleration signal over a first period of engine crankshaft rotation and providing a first acceleration signal responsive thereto, for measuring the filtered acceleration signal over a second period of engine crankshaft rotation and providing a second acceleration signal responsive thereto, wherein the second period is associated with a different engine cycle than the first period, and for measuring the filtered acceleration signal over a third period of engine crankshaft rotation and providing a third data point responsive thereto, wherein the third period is associated with a different engine cycle than the first and second periods;

means for subtracting an average of the first data point and the third data point from the second data point and providing a combined acceleration signal; and means for comparing the filtered acceleration signal to a threshold dependent on engine temperature, and providing a misfire indication when an amplitude of the combined acceleration signal exceeds the threshold.

17. A system in accordance with claim 16 wherein said means for measuring engine crankshaft acceleration over a first period of engine crankshaft rotation includes means for measuring engine crankshaft acceleration over a first period encompassing a plurality of engine crankshaft revolutions.

18. A system in accordance with claim 17 wherein said means for measuring engine crankshaft acceleration over a second period of engine crankshaft rotation includes means for measuring the engine crankshaft acceleration over a second period of engine crankshaft rotation encompassing a plurality of engine crankshaft revolutions directly following the plurality of engine crankshaft revolutions associated with the means for measuring engine crankshaft acceleration over a first period of engine crankshaft rotation.

19. A system in accordance with claim 16 wherein said means for measuring the filtered acceleration signal over the second period of engine crankshaft rotation includes means for measuring the filtered acceleration signal over the second period of engine crankshaft rotation after measuring the filtered acceleration signal over the first period of engine crankshaft rotation, and before measuring the filtered acceleration signal over the third period of engine crankshaft rotation.

20. A system in accordance with claim 16 wherein said means for measuring the filtered acceleration signal over each of the first, second, and third periods of engine crankshaft rotation comprises means for measuring the filtered acceleration signals over at least six contiguous rotations of the engine crankshaft.

21. A system in accordance with claim 20 further comprising a means for identifying a cylinder associated with an engine angular position when the engine crankshaft acceleration signal exceeds the threshold.

22. A system for determining misfire in a reciprocating engine, said system comprising:

means for measuring engine crankshaft angular velocity and providing an angular velocity signal responsive thereto;

means for filtering to substantially remove information related to normal combustion and for providing a filtered acceleration signal dependent on the engine crankshaft angular velocity signal and independent of normal combustion information;

means for extracting first, second and third data points from the filtered acceleration signal; and means for providing a misfire indication when an average of the first and third data points subtracted from the second data point exceeds a threshold dependent on at least one engine characteristic selected from a group of engine characteristics consisting of engine speed, engine load, and engine temperature.

23. A system in accordance with claim 22 wherein said means for extracting a first data point further comprises means for extracting a first series of data points over a period encompassing a plurality of engine crankshaft revolutions.

24. A system in accordance with claim 23 wherein said means for extracting a second data point further comprises means for extracting a second series of data points over a period encompassing a plurality of engine crankshaft revolutions directly following the plurality of engine crankshaft revolutions associated with the extracted first series of data points.

25. A system in accordance with claim 24 wherein said means for extracting a third data point further comprises means for extracting a third series of data points over a period encompassing a plurality of engine crankshaft revolutions directly following the plurality of engine crankshaft revolutions associated with the extracted second series of data points.

26. A system in accordance with claim 25 wherein said means for extracting a second series of data points includes means for extracting a second series of data points following the extracted first series of data points, and previous to the extracted third series of data points.

27. A system in accordance with claim 22 wherein said means for extracting a first, second, and third series of data points executes contiguously such that the engine crankshaft accelerations are extracted from the filtered acceleration signal over at least six adjacent rotations of the engine crankshaft.

28. A method for determining misfire in a reciprocating engine, said method comprising the steps of:

measuring engine crankshaft angular velocity and providing an angular velocity signal responsive thereto;

filtering to provide a filtered acceleration signal dependent on the engine crankshaft angular velocity signal and independent of normal combustion information;

extracting a first data point from the filtered acceleration signal corresponding to a combustion event of a predetermined cylinder of the reciprocating engine;

extracting a second data point from the filtered acceleration signal corresponding to another combustion event of the predetermined cylinder of the reciprocating engine; and averaging and comparing the averaged first and second data points of the filtered acceleration signal to a threshold dependent on at least one engine characteristic selected from a group of engine characteristics consisting of engine speed, engine load, and engine temperature, and providing a misfire indication when an amplitude of the averaged first and second data points of the filtered acceleration signal exceeds the threshold.

29. A method in accordance with claim 28 further comprising the steps of:

measuring the filtered acceleration signal and providing a third data point responsive thereto, wherein the third data point is associated with a different combustion event than the combustion event and the another combustion event;

averaging the first data point and the third data point and providing an average acceleration signal dependent thereon;

subtracting the average acceleration signal from the second data point and providing a combined acceleration signal; and providing a misfire indication when the an amplitude of the combined acceleration signal exceeds the threshold.

30. A method in accordance with claim 28 wherein the combustion event is related to the another combustion eve by one engine cycle.

31. A method for determining misfire in a reciprocating engine, said method comprising the steps of:

measuring engine crankshaft angular velocity and providing an angular velocity signal responsive thereto;

filtering to provide a filtered acceleration signal dependent on the engine crankshaft angular velocity signal and independent of normal combustion information;

extracting a first data point from the filtered acceleration signal;

extracting a second data point from the filtered acceleration signal; and averaging and comparing the averaged first and second data points of the filter acceleration signal to a threshold dependent on at least one engine characteristic selected from a group of engine characteristics consisting of engine speed, engine load, and engine temperature, and providing a misfire indication when an amplitude of the averaged first and second data points of the filtered acceleration signal exceeds the threshold.

32. A method in accordance with claim 31 wherein the first data point is extracted over a first period of engine crankshaft rotation and the second data point is extracted over a second period of engine crankshaft rotation wherein the second period is associated with a different engine cycle than the first period.

33. A method in accordance with claim 31 wherein the first and second data points are extracted from the filtered acceleration signal in adjacent engine cycles for a same cylinder.

34. A system for determining misfire in a reciprocating engine, said system comprising:

means for measuring engine crankshaft angular velocity and providing an angular velocity signal responsive thereto;

means for filtering to substantially remove information related to normal combustion and for providing a filtered acceleration signal dependent on the engine crankshaft angular velocity signal and independent of normal combustion information;

means for extracting a first data point from the filtered acceleration signal during a first revolution of the engine's crankshaft and for extracting a second data point from the filtered acceleration signal during another revolution of the engine's crankshaft following the first revolution of the engine's crankshaft; and means for combining and comparing the first and second data points of the filtered acceleration signal to a threshold dependent on engine temperature, and providing a misfire indication when an amplitude of an average of the combined first and second data points exceeds the threshold.

35. A method for determining misfire in a reciprocating engine, said method comprising the steps of:

measuring engine crankshaft angular velocity and providing an angular velocity signal responsive thereto; filtering to provide a filtered acceleration signal dependent on the engine crankshaft angular velocity signal and independent of normal combustion information;

measuring the filtered acceleration signal over a first period of engine crankshaft rotation and providing a first acceleration signal responsive thereto;

measuring the filtered acceleration signal over a second period of engine crankshaft rotation and providing a second acceleration signal responsive thereto, wherein the second period is associated with a different engine cycle than the first period;

measuring the filtered acceleration signal over a third period of engine crankshaft rotation and providing a third acceleration signal responsive thereto, wherein the third period is associated with a different engine cycle than the first and second periods;

combining the first acceleration signal, the second acceleration signal, and the third acceleration signal into a combined acceleration signal by averaging the first engine crankshaft acceleration signal and the third engine crankshaft acceleration signal and providing an average acceleration signal then subtracting the average acceleration signal from the second engine crankshaft acceleration signal and providing the combined acceleration signal; and comparing the combined acceleration signal to a threshold dependent on at least one engine characteristic selected from a group of engine characteristics consisting of engine speed, engine load, and engine temperature, and providing a misfire indication when an amplitude of the combined acceleration signal exceeds the threshold.

36. A method in accordance with claim 35 wherein said steps of measuring engine crankshaft acceleration over each of the first, second, and third periods of engine crankshaft rotation are executed contiguously such that said measurement steps measure the engine crankshaft acceleration over at least six contiguous rotations of the engine crankshaft.

37. A method in accordance with claim 36 further comprising a step of identifying a cylinder associated with an engine angular position when the engine crankshaft acceleration signal exceeds the threshold.

38. A method in accordance with claim 37 wherein said step of measuring engine crankshaft acceleration over a second period of engine crankshaft rotation includes measuring engine crankshaft acceleration over a second period of engine crankshaft rotation after said step of measuring engine crankshaft acceleration over a first period of engine crankshaft rotation, and before said step of measuring engine crankshaft acceleration over a third period of engine crankshaft rotation.

* * * * *

UNITED STATES PATENT AND TRADEMARK OFFICE
CERTIFICATE OF CORRECTION

PATENT NO. : 5,804,711
DATED : September 8, 1998
INVENTOR(S) : Remboski et al.

It is certified that error appears in the above-indentified patent and that said Letters Patent is hereby corrected as shown below:

Column 9, line 3 - 4 reads "said step off measuring engine crankshaft" should be -- said step of measuring engine crankshaft --.

Column 13, line 4 reads "another combustion eve by one" should be -- another combustion event by one --.

Column 14, line 4 reads "responsive thereto; filtering to" should be -- responsive thereto; (new paragraph) filtering to --.

Signed and Sealed this

Eleventh Day of May, 1999

Attest:

Q. TODD DICKINSON

*Attesting Officer*    *Acting Commissioner of Patents and Trademarks*